(12) United States Patent
Fogg

(10) Patent No.: US 6,869,094 B2
(45) Date of Patent: Mar. 22, 2005

(54) PERSONAL WATERCRAFT STAND AND TOTE DEVICE

(76) Inventor: Michael T. Fogg, 2459 Lakeshore Drive North, Holland, MI (US) 49424

( * ) Notice: Subject to any disclaimer, the term of this patent is extended or adjusted under 35 U.S.C. 154(b) by 0 days.

(21) Appl. No.: 10/356,068

(22) Filed: Jan. 31, 2003

(65) Prior Publication Data
US 2003/0164604 A1 Sep. 4, 2003

Related U.S. Application Data
(60) Provisional application No. 60/353,977, filed on Jan. 31, 2002.

(51) Int. Cl.[7] .................................................. B60P 7/00
(52) U.S. Cl. ..................... 280/414.3; 180/193; 414/538
(58) Field of Search .......................... 280/414.3, 414.1; 180/19.1, 19.2, 19.3, 16; 414/462, 538

(56) References Cited

U.S. PATENT DOCUMENTS

| | | | | |
|---|---|---|---|---|
| 3,896,892 A | * | 7/1975 | Kohls et al. ................ 180/19.2 |
| 5,396,857 A | * | 3/1995 | Emery, Jr. ................... 114/382 |
| 5,417,447 A | * | 5/1995 | Godbersen ................ 280/414.1 |
| 5,431,122 A | * | 7/1995 | Templet, Jr. ................. 114/222 |
| 5,722,809 A | * | 3/1998 | Urbank ........................ 414/529 |
| 5,961,139 A | * | 10/1999 | Nichols, II ................ 280/414.1 |
| 6,276,469 B1 | * | 8/2001 | Smith ......................... 180/19.1 |
| 6,361,060 B1 | * | 3/2002 | Kamminga .............. 280/414.1 |
| 2002/0134295 A1 | * | 9/2002 | Chimato ...................... 114/344 |

FOREIGN PATENT DOCUMENTS

JP  10-324111  * 12/1998  ............. B60C/7/12

* cited by examiner

Primary Examiner—Avraham Lerner
(74) Attorney, Agent, or Firm—King & Jovanovic, PLC

(57) ABSTRACT

A personal watercraft stand and tote device comprising a frame member, a control assembly associated with the frame member, a powertrain assembly associated with the frame member and the control assembly, a handle assembly associated with the frame member, and, a loading assembly associated with the frame member. The control assembly includes a motor and an control unit positioned within a housing. The device is capable of powered operation in a fully submerged condition, such as, for example five feet below the water.

16 Claims, 5 Drawing Sheets

PERSONAL WATERCRAFT STAND AND TOTE DEVICE

CROSS-REFERENCE TO RELATED APPLICATION

This application claims the benefit of U.S. provisional patent application Ser. No. 60/353,977 filed Jan. 31, 2002, the entirety of which is hereby incorporated herein by reference.

BACKGROUND OF THE INVENTION

1. Field of the Invention

The present invention relates in general to a stand and tote, and more particularly to a stand and tote device for personal watercrafts which is submersible.

2. Background Art

From small ponds, lakes, and rivers, to large bodies of water like the Great Lakes, the use of personal watercraft has become quite popular. As such watercraft use has become popular among all types of people, from adults to children, and includes both men and women, certain difficulties have been encountered.

In particular, certain watercraft can be quite heavy (400 to 1000+ pounds). As such, it is often difficult for a user to transport the watercraft from the beach or other storage area to the water. In addition, as such watercraft generally comprise fiberglass inflatable regions, etc., they can be damaged by dragging across the ground.

While certain carts or totes have been provided which overcome such difficulties, such solutions have certain drawbacks. Certain totes include relatively small wheels and components, which may help the storage and toting of a personal watercraft around, for example, a shop, but which is not usable on the rugged terrain at the water's edge. Other totes provide larger wheels to tackle such terrain but are operated manually and generally require a great deal of strength to operate. Lastly, certain totes are not submersible and either the final loading or unloading must be accomplished manually.

Accordingly, it is an object of the invention to overcome the shortcomings of the prior art by providing a powered, submersible and rugged device which is capable of facilitating the full launch and retrieval of a personal watercraft in varying terrain.

SUMMARY OF THE INVENTION

The invention comprises a personal watercraft stand and tote device. The device comprises a frame member, a control assembly, a powertrain assembly, a handle assembly and a loading assembly. The control assembly is associated with the frame member. The control assembly includes a motor and an control unit positioned within a housing. The powertrain assembly is associated with the frame member and the control assembly. The handle assembly is associated with the frame member. The loading assembly is associated with the frame member. The device is capable of operation in a fully submerged condition.

In a preferred embodiment, the housing of the control assembly is substantially watertight to a depth of at least five feet.

In another preferred embodiment, the control assembly further comprises a user controller. In one such preferred embodiment, the user controller includes a throttle control positioned on the handle assembly. In another such embodiment, the throttle control comprises a wig-wag thumb tab having a cable associated therewith. In another embodiment of the invention, user controller comprises at least one mechanically activated or actuated member, which, in turn, provides an input to the control unit within the housing.

Preferably, the user controller further includes a master switch coupled with a master control within the housing. In one such embodiment, the master switch comprises a reed type switch positioned within the housing, and a selectively positionable magnet movable along an outside of the housing.

In a preferred embodiment, the powertrain assembly further comprises a plurality of axles, each axle having a plurality of wheels. Preferably, the plurality of axles further comprises three axles, and the plurality of wheels comprises at least two wheels per axle. In one embodiment, at least one of the plurality of wheels is filled with a fluid which is at least as dense as water.

In yet another preferred embodiment, the handle assembly further comprises a steering assembly interfacing with at least a portion of the powertrain assembly, such that, movement of the handle assembly in a substantially horizontal direction steers the device.

In another preferred embodiment, the loading assembly further comprises a bunk assembly and a winch assembly. Preferably, the bunk assembly further comprises a pair of opposing bunks and at least one top surface interfacing roller. The top surface interfacing roller is capable of rolling about a portion of the frame member.

In yet another preferred embodiment, the bunk assembly further comprises at least one lower body interfacing roller, the at least one lower body interfacing roller capable of facilitating the slidable placement of a watercraft along the bunk assembly.

Preferably, the winch assembly is associated with at least a portion of the frame at the one end and with one of the watercraft and the bunk assembly at the other end thereof.

In one embodiment, the control assembly further comprises a plurality of batteries. Preferably, the plurality of batteries comprise at least one submersible gel cell positioned outside of a housing.

BEST MODE FOR PRACTICING THE INVENTION

Figure 1:
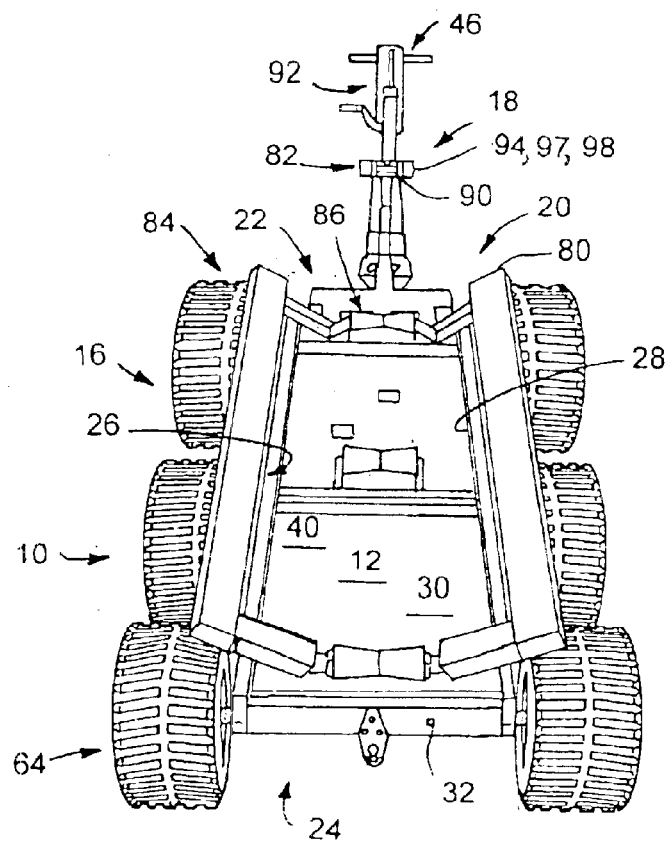
FIG. 1 of the drawings is a perspective view of the personal watercraft stand and tote.

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

It will be understood that like or analogous elements and/or components, referred to herein, are identified throughout the drawing by like reference characters. In addition, it will be understood that the drawing is merely a representation, and some of the components may have been distorted from actual scale for purposes of pictorial clarity.

Referring now to the figures, and in particular to FIGS. 1 and 2, personal watercraft stand and tote (hereinafter sometimes termed the "device") is shown generally at 10. In particular, personal watercraft stand and tote 10 includes frame assembly 12, control assembly 14, powertrain assembly 16, handle assembly 18 and loading assembly 20.

Figure 2:
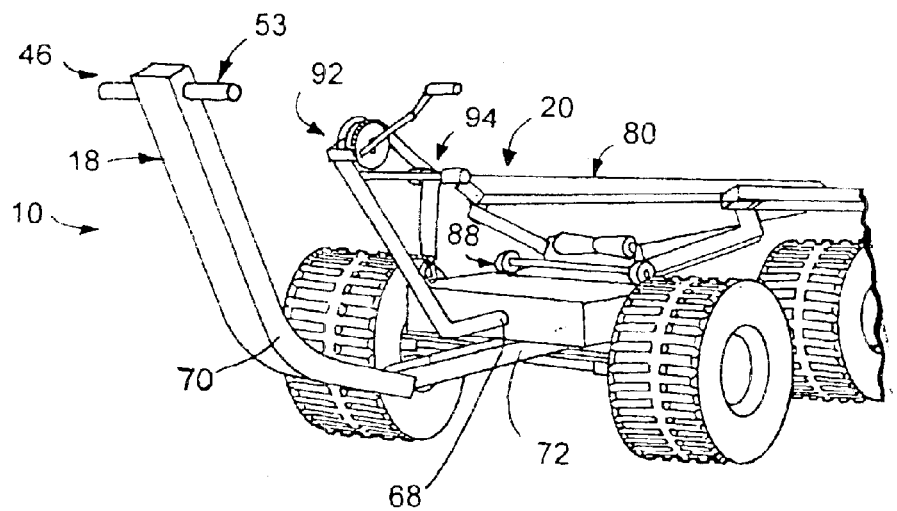
FIG. 2 of the drawings is another perspective view of the personal watercraft stand and tote.

Frame assembly 12 is shown in FIGS. 1, 2 and/or 3, collectively, as comprising proximal end 22, distal end 24 which are separated from each other by side edges 26, 28. Together these components define a frame. The frame includes top surface 30 and bottom surface 32. Top surface 30 includes a surface finish which promotes traction and is substantially no-slip. Frame assembly 12 may further be associated with a ball hitch. Generally, the components of the frame assembly comprise welded stainless steel components which exhibit good strength and corrosion characteristics. In other embodiments, certain of the components may comprise other metals which likewise exhibit good strength and corrosion characteristics. Of course, the use of composite and other types of materials is likewise contemplated as long as the materials exhibit proper strength and corrosion qualities.

Figure 3:
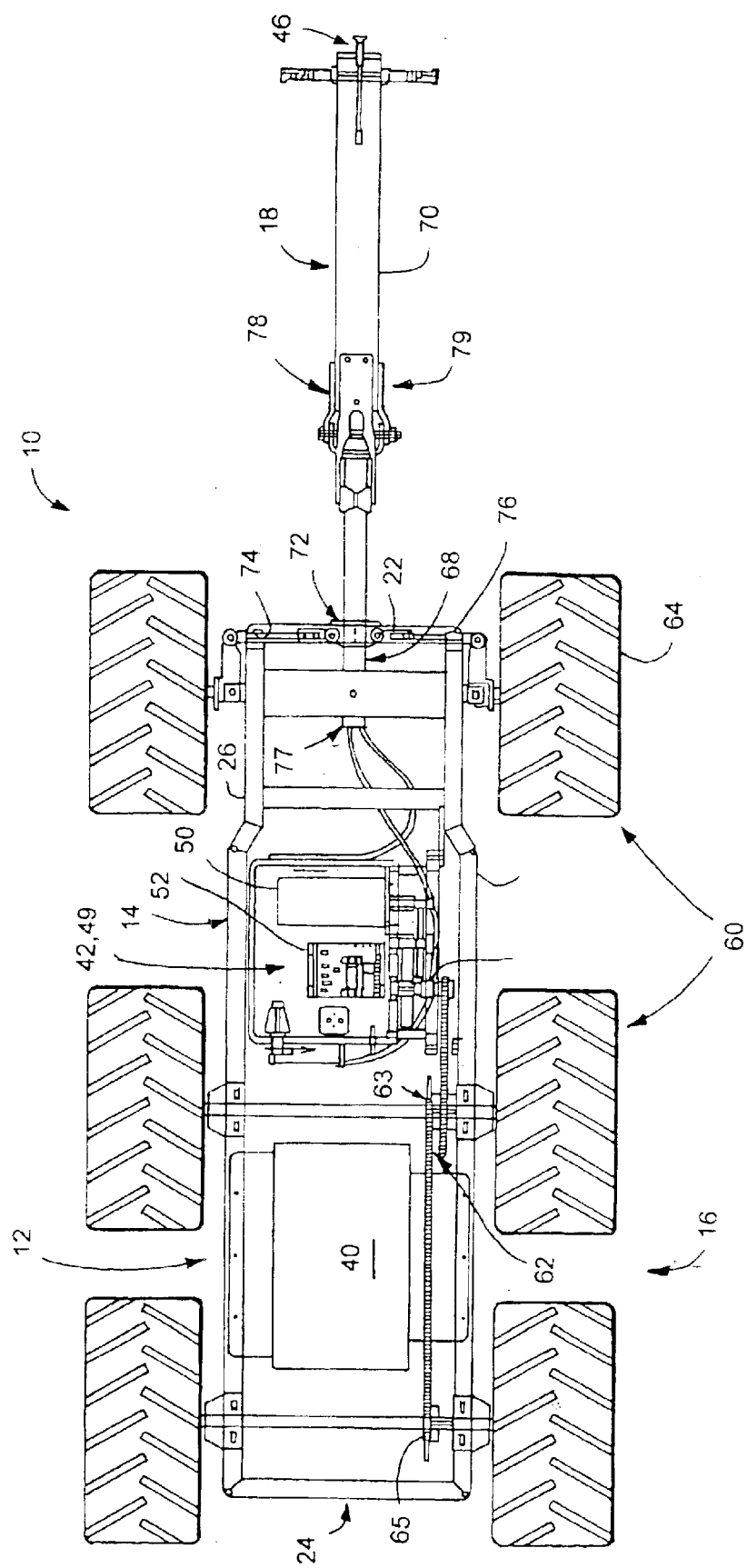
FIG. 3 of the drawings is a top plan view of the components of the personal watercraft stand and tote.
Figure 4:
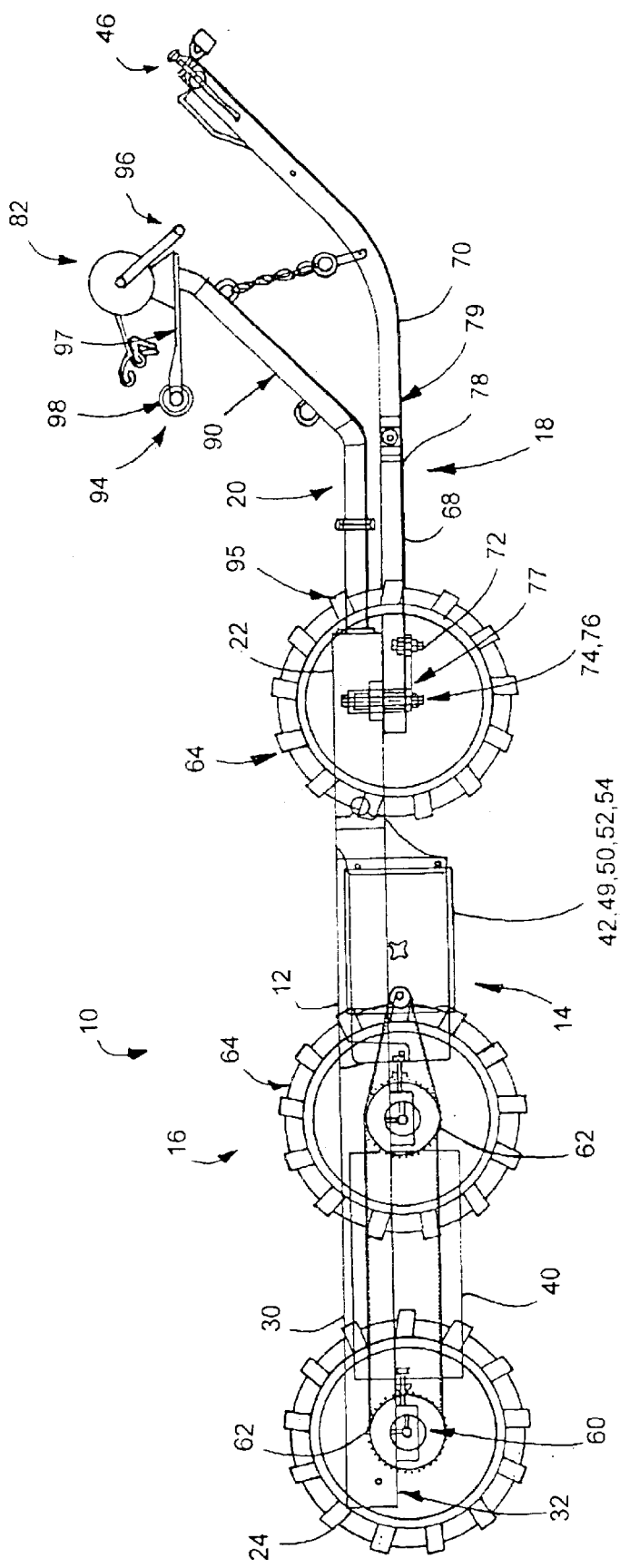
FIG. 4 of the drawings is a side elevational view of the components of the personal watercraft stand and tote.

Control assembly 14 is shown in FIGS. 3 and 4 as comprising power supply 40, motor and logic unit 42 and user controller 46. Power supply 40 generally comprises a plurality of batteries which have a sufficient output. In the particular embodiment, three 12 volt batteries are placed in series to generate 36 volts, however, a variety of batteries are contemplated for use, including, but not limited to, submersible gel cells, which are capable of being submersed more than five feet without leaking.

Motor and logic unit 42 includes housing 49, motor 50 and control unit 52. Housing 49 generally comprises a stainless steel case which can be fully sealed to a water-tight configuration after being submersed in approximately 6 feet of water. Indeed, the case can be filled with dry air, other gas, such as an intert gas, for example, and fully sealed to preclude the ingress of any fluid therein to the above-contemplated depths. A variety of different configurations and materials are contemplated for housing 49. Motor 50 is positioned within housing 49 and includes output shaft 54 which extends through a fluid tight opening in housing 49. The motor in the present embodiment comprises a two horsepower 36 VDC motor. While control unit 52 is generally associated with motor 50 and preferably comprises a fully electronic, bi-polar, motor controller with acceleration and deceleration control. Of course, other types of controllers, which are capable of controlling motor 50 are likewise contemplated for use, including but not limited to electro-mechanical control units.

User controller 46 generally comprises a plurality of different switches positioned at various locations about the device. In particular, user controller 46 includes throttle control 53 which is positioned on handle assembly 18. Throttle control 53 comprises a wig-wag thumb tab with stainless steel cable extending to housing 49. In addition, user controller 46 includes master switch which is associated with the master solenoid in housing 49. The master switch includes a stainless steel cable and includes no electrical components which are prone to exposure to moisture. For example, the master switch (as well as other user controller switches and actuators) may comprise a magnetic (reed type switch) to control the operation thereof. In particular, in the present embodiment of the invention, the master switch includes a movable magnet on the outside of the housing which can be moved to selectively engage or disengage (i.e., control) a reed type switch within the housing. Moreover, user controller 46 includes neutral switch which facilitates the placement of the drive wheels in a free-wheel or neutral state wherein the device can be pushed around without powering the motor.

Advantageously, housing 49 includes therewithin substantially, if not, all of the electrical components (generally excluding the batteries). In turn, user controller 46 comprises a plurality of mechanically activated or actuated members which serve to provide input to the electrical components within the housing. In such a manner, by maintaining the electrical components within the controlled environment of the housing, corrosive effects and premature destruction of the electrical components can be virtually eliminated.

Powertrain assembly 16 is shown in FIGS. 3–6 as comprising axles such as axle 60. In the particular embodiment, the device includes three separate axles. While other variations are contemplated, the axles comprise stainless steel axles with self-lubricated bearings. Each of the axles includes a plurality of wheels, such as wheels 64. Each wheel is mounted to opposing ends of the respective axles. The wheels can be filled with fluid (i.e., water, water/coolant, etc.), to assist with adjusting buoyancy. It is contemplated all or fewer than all wheels can be filled with fluid. It is contemplated that the fluid in at least some of the wheels comprises a fluid that has a density equal to or greater than water.

As will be explained the front axle is utilized for steering and the rear two axles are powered by the motor. As such, the middle axle includes gears 62, 63 and the rear axle includes gear 65. Gear 62 is linked via a chain to output shaft 54. Gears 63 and 65 are likewise linked via a chain. It is contemplated in certain embodiments that only one of the two axles is powered by the motor. It is contemplated that the chains comprise stainless steel and that the gears comprise steel, however, various other configurations are likewise contemplated.

Handle assembly 18 is shown in FIGS. 3–6 as comprising first linkage 68, second linkage 70 and steering assembly 72. First linkage 68 includes first end 77 pivotally associated with proximal end 22 of frame assembly 12 and a second end 78 distally spaced therefrom. Second linkage 70 includes a first end 79 which is pivotally coupled to second end 78 of first linkage 68. The handle assembly, it is contemplated, comprises a stainless steel material, while other materials are likewise contemplated. In addition, it is contemplated that the steering assembly can be releasably attached to arm 90 of winch assembly 82 of loading assembly 20 so that in an unused state, the handle assembly can remain in an upright and ready to use position.

Steering assembly 72 includes tie rods 74 and 76. The tie rods are pivotally associated to opposing sides of first linkage 68 and extend to opposing wheels of the front axle. As such, as the handle member is pivoted in a first direction, the front wheels are likewise pivoted in the same direction. Subsequently, as the handle member is pivoted in a second direction, the front wheels are likewise pivoted in the second direction. To facilitate ease of steering, two handle grips are positioned on either side of the second end of the second linkage. In addition, it is generally contemplated that the front wheels are filled with air instead of fluid to facilitate turning of the device.

Figure 5:
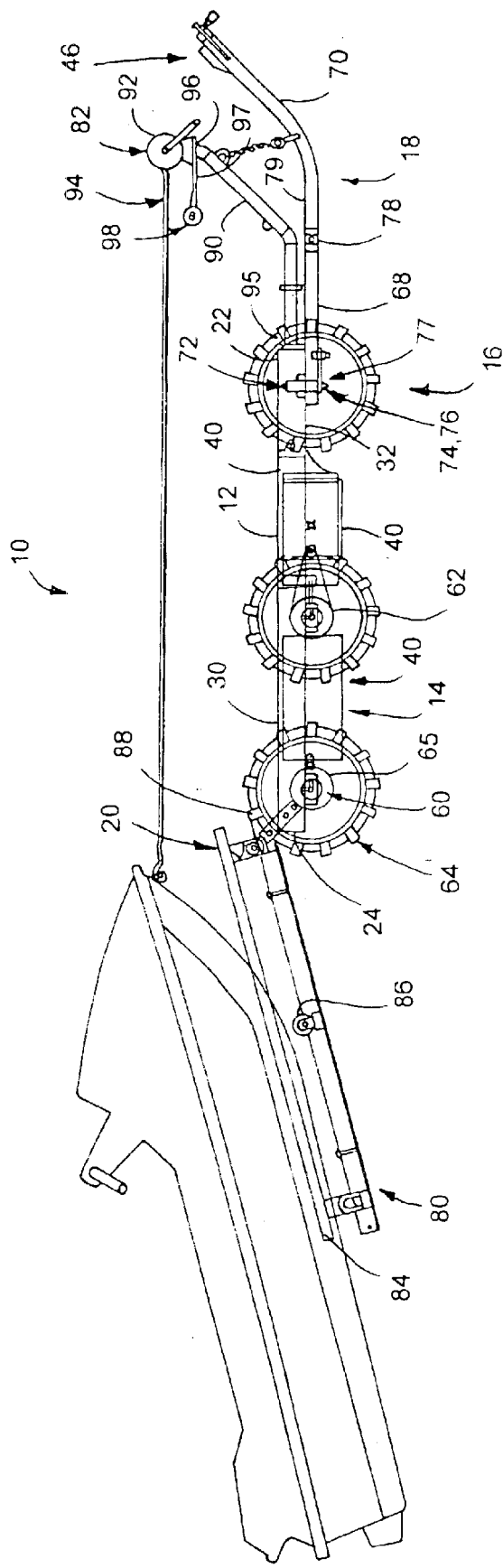
FIG. 5 of the drawings is a side elevational view of the personal watercraft stand and tote, showing, in particular, the loading of a personal watercraft.
Figure 6:
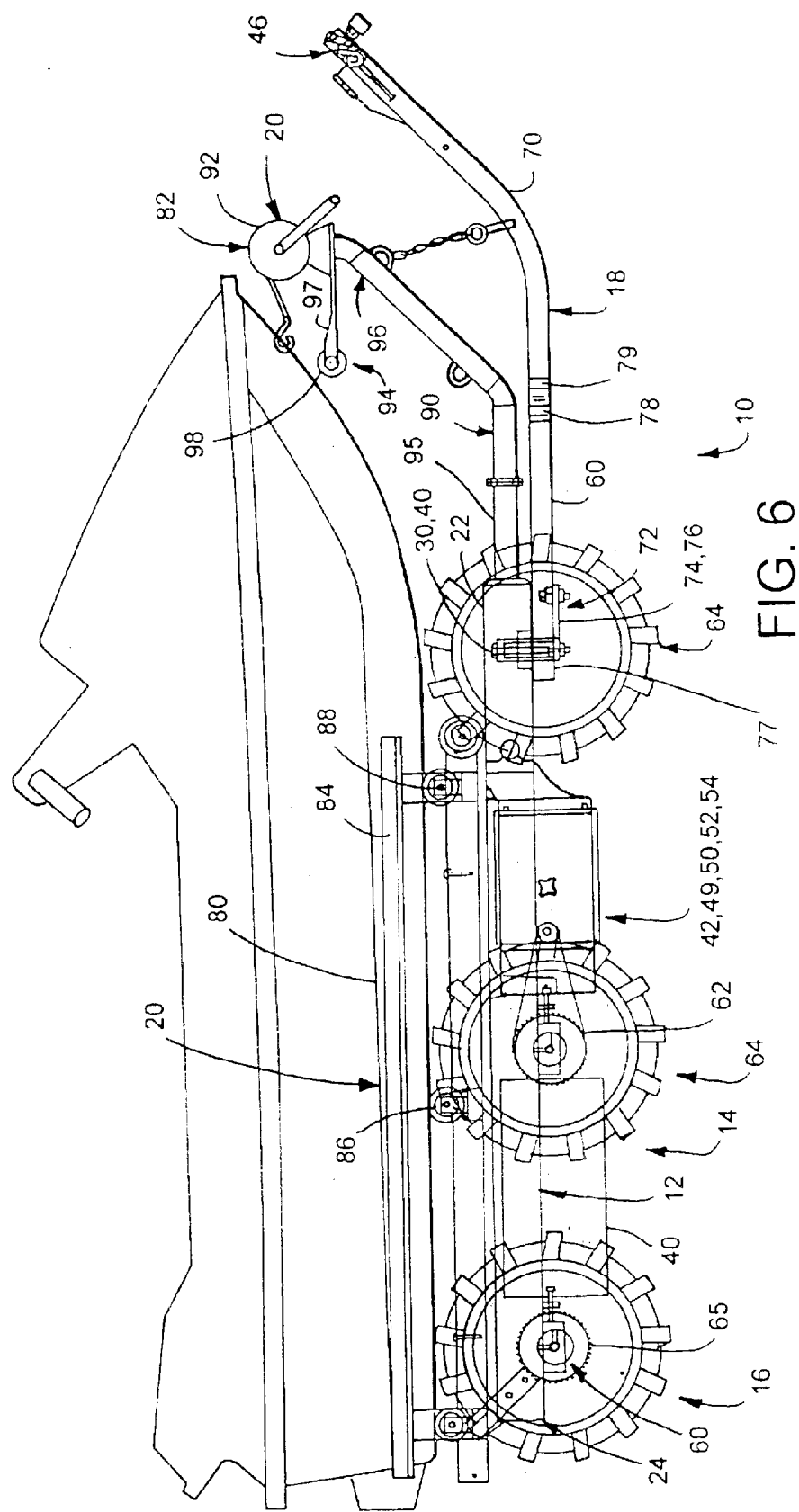
FIG. 6 of the drawings is a side elevational view of the personal watercraft stand and tote, showing, in particular, a personal watercraft loaded thereon.

Loading assembly 20 is shown in FIGS. 1 and 3–6 as comprising bunk assembly 80 and winch assembly 82. Bunk assembly 80 includes opposing bunks 84, lower body interfacing rollers 86 and top surface interfacing rollers 88. The bunk assembly 80 is capable of securing a personal watercraft, as shown in FIG. 6 about the opposing bunks and the lower body interfacing rollers. In addition, the top surface interfacing rollers 88 facilitate the rolling of the loading assembly 20 relative to top surface 30 of frame assembly 12. Certain embodiments may include a stop member which precludes the complete disconnection between the bunk assembly and the top surface of the frame assembly.

Winch assembly 82 is shown in FIGS. 2 and 4–6 as comprising arm 90, winch 92 and stop assembly 94. Arm 90 includes first end 95 which is attached to proximal end 22 of frame assembly 12, and second end 96 spaced therefrom. Winch 92 is positioned proximate second end 96 of arm 90. As will be understood, the winch can be attached to the personal water craft to facilitate loading and unloading of same from the device. Stop assembly 94 includes support 97 and padded stop 98. The stop assembly is positioned proximate second end 96 of arm 90. The stop assembly allows for positive contact at the end of the travel of winch 92 without substantially marring or otherwise damaging the personal watercraft.

In operation, the user can first direct the device toward a watercraft positioned in the water. Next, the user can position the device below the watercraft. Subsequently, the device can be driven out of the water with the watercraft guided on the water in a position above the submerged device. As the water level decreases, the watercraft will be guided onto the bunk assembly positioned on the frame assembly. As the device continues out of the water, the watercraft will be properly positioned upon the frame assembly.

To place the watercraft back into the water, the device with the watercraft positioned thereon, can be driven into the water. Once driven into the water, the watercraft can be disconnected, wherein it will float on the water, whereas the device remains submerged. Upon detachment, the device can be driven out of the water leaving the watercraft.

Outside of the water, the bunk assembly can be utilized to facilitate the placement of the watercraft onto the device and the removal of the watercraft from the device. As shown in FIGS. 5 and 6, the bunk assembly is positioned at an angle at the distal end of the frame assembly. As the watercraft is moved by manipulating the winch onto the bunk assembly, the bunk assembly tilts and slides onto the top surface of the frame assembly, and rolls to its final position on the top surface of the frame assembly.

It will be understood that the advantages of the personal watercraft stand and tote include the ability to traverse all types of terrain, the ability to easily remove and mount the personal watercraft in varying conditions, and the ability to operate in a fully submerged position. Indeed, the full unit (i.e., control assembly, powertrain assembly, etc.) can be fully submerged to depths such as 5 to 6 feet while fully maintaining the powered operation thereof.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A personal watercraft stand and tote device comprising:
   a frame member;
   a control assembly associated with the frame member, the control assembly including:
   a motor and a control unit positioned within a housing; and
   a user controller, the user controller including a throttle control positioned on a handle assembly;
   a powertrain assembly associated with the frame member and the control assembly;
   the handle assembly associated with the frame member; and
   a loading assembly associated with the frame member,
   wherein the device is capable of operation in a fully submerged condition.

2. The personal watercraft stand and tote device of claim 1 wherein the housing of the control assembly is substantially watertight to a depth of at least five feet.

3. The personal watercraft stand and tote device of claim 1 wherein the throttle control comprises a wig-wag thumb tab having a cable associated therewith.

4. The personal watercraft stand and tote device of claim 1 wherein the user controller comprises at least one mechanically activated or actuated member, which, in turn, provides an input to the control unit within the housing.

5. The personal watercraft stand and tote device of claim 1 wherein the user controller further includes a master switch coupled with a master control within the housing.

6. The personal watercraft stand and tote device of claim 5 wherein the master switch comprises a reed type switch positioned within the housing, and a selectively positionable magnet movable along an outside of the housing.

7. The personal watercraft stand and tote device of claim 1 wherein the powertrain assembly further comprises a plurality of axles, each axle having a plurality of wheels.

8. The personal watercraft stand and tote device of claim 7 wherein the plurality of axles further comprises three axles, and the plurality of wheels comprises at least two wheels per axle.

9. The personal watercraft stand and tote device of claim 7 wherein at least one of the plurality of wheels is filled with a fluid which is at least as dense as water.

10. The personal watercraft stand and tote device of claim 1 wherein the handle assembly further comprises a steering assembly interfacing with at least a portion of the powertrain assembly, such that, movement of the handle assembly in a substantially horizontal direction steers the device.

11. The personal watercraft stand and tote device of claim 1 wherein the loading assembly further comprises a bunk assembly and a winch assembly.

12. The personal watercraft stand and tote device of claim 11, wherein the bunk assembly further comprises:
   a pair of opposing bunks; and
   at least one top surface interfacing roller, the top surface interfacing roller capable of rolling about a portion of the frame member.

13. The personal watercraft stand and tote device of claim 12, wherein the bunk assembly further comprises at least one lower body interfacing roller, the at least one lower body interfacing roller capable of facilitating the slidable placement of a watercraft along the bunk assembly.

14. The personal watercraft stand and tote device of claim 11 wherein the winch assembly is associated with at least a portion of the frame at the one end and associatable with one of the bunk assembly and a watercraft at the other end thereof.

15. The personal watercraft stand and tote device of claim 1 wherein the control assembly further comprises a plurality of batteries.

16. The personal watercraft stand and tote device of claim 15 wherein the plurality of batteries comprise at least one submersible gel cell positioned outside of a housing.

* * * * *